Patented Apr. 28, 1942

2,280,860

UNITED STATES PATENT OFFICE 2,280,860

COATING COMPOSITION AND METHOD OF MAKING SAME

William H. Smyers, Westfield, N. J., assignor to Standard Oil Development Company, a corporation of Delaware No Drawing. Application December 30, 1933, Serial No. 704,747

11 Claims. (Cl. 260—757)

This invention relates to improved coating compositions and to novel methods of preparing same.

Broadly, it comprises swelling a colloidal material such as rubber with a soltuion of a substantially non-volatile organic constituent such as paraffin wax or other high molecular weight hydrocarbons dissolved in a suitable volatile solvent such as gasoline, applying the composition to the surface to be coated and allowing the volatile solvent to evaporate. The resulting composition is found to be a homogeneous mixture of high molecular weight hydrocarbons or other similar material intimately and uniformly dispersed within the particles or cells of the colloid. The homogeneity of this composition is a distinct advantage over the heterogeneous character of compositions prepared by mere mechanical mixing of a heavy hydrocarbon such as paraffin wax with a colloid such as rubber or by separately dissolving each of these materials in a volatile solvent and mixing the two solutions, both of which methods have been commonly used in the past. One disadvantage of these prior compositions is that upon evaporation of the volatile solvent the paraffin crystallizes into relatively large crystals and tends to migrate to the surface of the composition and eventually becomes oxidized or washed away by action of rain, leaving the rubber particles unprotected from oxidation by air.

The present invention overcomes those and other disadvantages of the prior art by providing a composition in which the colloid and the high molecular weight hydrocarbon or other non-volatile organic material appear to mutually protect each other. It is believed that the cell walls of the rubber particles, owing to the particular method of preparation, intimately surround the minute particles of paraffin and thereby prevent the formation of large crystals and prevent migration of the paraffin to the surface of the coating. It is also believed that the paraffin or other high molecular weight hydrocarbon being uniformly and intimately dispersed within the rubber colloid particles, serves to protect the latter from oxidation and other deteriorating effects of the weather.

For the sake of illustration, one method of carrying out the invention is described in detail as follows:

The paraffin wax is dissolved in gasoline at room temperature until the gasoline is practically saturated with paraffin and then just sufficient crude rubber (in the form of small pieces or thin sheets) is added to absorb practically all of the paraffin-gasoline solution. During this absorption the rubber swells; the swelling is allowed to proceed without agitation and when practically completed, any residual paraffin solution is removed by decantation, filtration and/or washing with fresh gasoline. Then the swollen jelly-like rubber aggregates are mechanically comminuted in any suitable manner (as by forcing through a $\frac{1}{16}$" wire mesh, etc.) just sufficiently to make a fairly uniform and spreadable composition but not so much as to break down the colloidal structure of the rubber.

In place of paraffin wax, other hydrocarbons can be used such as viscous lubricating oil, petrolatum, or polymerized olefines, diolefines, etc. or any mixtures of these various hydroarbons with or without paraffin wax. Also, natural waxes or gums, high molecular weight alcohols, ketones, esters, ethers or other substantially non-volatile organic materials may be used.

A hydrocarbon polymer offering particularly interesting possibilities in this respect is prepared by polymerizing isobutylene at low temperature (such as —10° C.) in the presence of boron fluoride as catalyst. This polymer is a substantially colorless, odorless plastic having almost any desired molecular weight such as between 2,000 and 10,000 or so as desired. A composition prepared by dissolving 1 to 10% of this high molecular weight isobutylene polymer in gasoline and swelling rubber in the resultant solution is in itself useful as a "rubber cement" adhesive because the high molecular weight polymer makes the composition remain plastic even long after evaporation of the solvent and at the same time it helps to protect the thin layer of rubber from oxidation and other types of deterioration. Also, the rubber-isobutylene polymer composition left after the evaporation of the solvent is an excellent insulating material for electric wires, cables, etc. or for other types of electrical apparatus such as condensers, etc. Similar compositions prepared by the use of paraffin wax, petrolatum, heavy oils or mixtures thereof, instead of the isobutylene polymer, are also useful for electric insulation and they present certain advantages over prior compositions used for that purpose inasmuch as they are homogeneous intracellular dispersions of the high molecular weight hydrocarbons within the colloidal rubber particles and hence possess higher dielectric capacity. The rubber or other colloidal material should be one having a continuous, meshed or aggregate structure and not composed of many small separate particles; for instance, unmasticated rubber is better than masticated rubber, in which the particles or cells have been mashed and torn apart by heavy mechanical rolling on a rubber mill.

Instead of rubber, any other rubbery, i. e. flexible rubber-like, colloidal material swellable by non-aqueous volatile solvents may be used such as certain rubber substitutes, cellulose derivatives, and other natural or synthetic colloidal resins or gums which swell when subjected to the action of naphtha or other suitable volatile solvents. Instead of using gasoline or naphtha, any other suitable volatile solvents or swelling agents may be used such as benzol, toluol or aromatic or mixed aliphatic and aromatic hydrocarbons, esters, ethers, ketones, etc. One essential feature is that the solvent or swelling agent should dissolve the high molecular weight hydrocarbon or other non-volatile organic constituent which is to be incorporated within the colloid but that it should not actually dissolve the colloidal material itself. In other words, it is desired that some of the original colloidal structure of the rubber be maintained. If desired, other non-volatile ingredients soluble in those solvents may be incorporated into the composition by dissolving them in the gasoline at the same time as the high molecular weight hydrocarbon. For instance, chlorinated, fluorinated or other halogenated compounds may be used to make the composition fireproof and still other ingredients may be added such as amino-or hydroxy-organic compounds or other anti-oxidants, and substances adapted to absorb the actinic rays of light which tend to destroy the rubber. Also, finely divided solids such as carbon black, etc. may be mechanically mixed into the composition before or after the swelling of the colloid or any other time before evaporation of the solvent.

In carrying out the invention it is obvious that the detailed method described above may be varied somewhat without departing from the broader scope of the invention. For instance, a slight warming of the gasoline with or without pressure may be used to facilitate solution of the paraffin wax. Also a slight warming may be used to accelerate the swelling of the rubber in the paraffin-gasoline solution although probably excessive heating would destroy the colloidal aggregate structure of the rubber.

The exact amount of materials to be used in preparing the many varied compositions possible according to this invention cannot be stated definitely inasmuch as the proportions to be used will vary according to the materials used and to the particular use for which the composition is intended. For use as a waterproofing composition, the following proportions by weight have been found suitable:

| | Per cent |
|---|---|
| Gasoline, 80–85%, preferably about | 82 |
| Paraffin, 8–12%, preferably about | 10 |
| Rubber, 7–10%, preferably about | 8 |
| | 100 |

It should also be noted that the flexibility and hardness of the composition may be controlled within fairly wide limits by varying the type and proportion of non-volatile organic constituent to be dispersed within the rubber. The higher the molecular weight and possibly also the higher the viscosity of these non-volatile constituents, the less of them can be absorbed by the colloid.

Compositions prepared according to this invention have been found applicable to a wide variety of uses such as waterproofing of cloth in making flexible automobile tops, raincoats, tents, awnings, etc. and in waterproofing various other materials such as paper, wood, masonry, leather, etc. A particular advantage of the invention is that the composition, prepared according to the preferred method, does not penetrate to any substantial extent into the surface to which the coating composition is applied. In other words, it may be used to waterproof one side of a thin paper or cloth without waterproofing the other side. A specific use of this type of composition is claimed separately in co-pending application Ser. No. 670,730. The invention has also been found useful for preventing the corrosion of metals and for preventing the oxidation and deterioration of rubber goods such as auto tires, rubber raincoats, etc., as well as paintings and other such surfaces. The use for electrical insulating purposes has already been referred to above.

The invention should not be limited by any of the specific examples given nor by any theory of operation of the invention but only by the appended claims in which it is intended to claim all inherent novelty in the invention as broadly as the prior art permits.

I claim:

1. An improved flexible coating composition for waterproofing a surface of a fibrous sheet material comprising a uniformly homogeneous mixture of wax and rubber, said composition being compounded of a colloidal rubber uniformly and completely swelled to a jelly-like mass, the rubber being substantially preserved against excessive decomposition so as to retain its colloidal structure, the wax being homogeneously dispersed in the rubber, and said jelly-like mass being smoothly spreadable on the surface of a fibrous sheet material without substantial penetration.

2. The process of preparing an improved composition for coating a fibrous sheet at its surface which comprises dissolving a high molecular weight non-volatile protective substance selected from the group consisting of paraffin wax, petrolatum, natural wax, and plastic isobutylene polymers in a major proportion of a volatile solvent capable of swelling rubber, swelling a flexible, colloidal rubber by the resulting solution until the rubber is uniformly and completely swelled to a jelly-like mass while retaining its aggregate colloidal structure with said high molecular weight non-volatile protective substance homogeneously and essentially intracellularly dispersed within particles of the colloidal rubber, and said jelly-like mass makes a smooth spreading, non-penetrating coating on the surface of a fibrous sheet.

3. The method of preparing an improved coating composition for fibrous sheet materials which comprises preparing a liquid solution of wax capable of swelling rubber, swelling a flexible unmasticated crude rubber having an aggregate colloidal structure with said solution with slight warming and without agitation until the rubber with its aggregate colloidal structure substantially preserved is uniformly and completely swelled to a jelly-like mass containing the wax homogeneously dispersed and said jelly-like mass is a smooth spreading non-penetrating composition which waterproofs only that surface of a fibrous sheet to which it is applied.

4. A waterproofed sheet material comprising a fibrous sheet smoothly coated with a flexible plastic composition comprising a flexible, colloidal unmasticated crude rubber homogeneously mixed with a paraffin wax, said composition being compounded of a colloidal unmasticated crude rubber uniformly swelled with said wax absorbed therein to a jelly-like mass that is smoothly spread on the surface of said fibrous sheet material without substantial penetration, the flexible, colloidal rubber being substantially preserved against excessive decomposition so as to retain its colloidal structure with the paraffin wax homogeneously dispersed therein.

5. A composition as described in claim 4, in which said fibrous sheet material is paper.

6. A composition as described in claim 4, in which said fibrous sheet material is a cloth.

7. An improved flexible coating composition for a fibrous sheet material comprising a uniformly homogeneous mixture of paraffin wax and crude rubber, said composition being compounded of colloidal crude rubber uniformly and completely swelled to a jelly-like mass by a saturated solution of the paraffin wax in a volatile organic solvent, the rubber being substantially preserved against excessive decomposition so as to retain its colloidal structure, the wax being homogeneously dispersed in the colloidal rubber, said jelly-like mass being smoothly spreadable on the surface of a fibrous sheet material without substantial penetration, and said flexible coating composition being a normally non-volatile homogeneous mixture of the wax and rubber which remains after evaporation of said volatile solvent.

8. The method of preparing an improved coating composition for waterproofing fibrous sheet materials which comprises preparing a liquid solution of wax in a volatile organic solvent capable of swelling crude rubber, swelling a flexible unmasticated crude rubber having an aggregate colloidal structure with said solution until the rubber with its aggregate colloidal structure substantially preserved is uniformly and completely swelled to a jelly-like mass containing from about 8 to 12 parts of the wax homogeneously dispersed in 7 to 10 parts of the colloidal rubber, and said jelly-like mass is a smooth-spreading non-penetrating composition which waterproofs only that surface of the fibrous sheet to which it is applied.

9. An improved flexible coating composition for waterproofing a surface of a fibrous sheet material comprising a uniformly homogeneous mixture of rubber and a high molecular weight non-volatile protective substance selected from the group consisting of paraffin wax, petrolatum, natural wax, and plastic isobutylene polymers, said composition being compounded of a colloidal rubber uniformly and completely swelled to a jelly-like mass, the rubber being substantially preserved against excessive decomposition so as to retain its colloidal structure, said protective substance being homogeneously dispersed in the rubber, and said jelly-like mass being smoothly spreadable on the surface of a fibrous sheet material without substantial penetration.

10. An improved flexible coating composition for waterproofing a surface of a fibrous sheet material comprising a uniformly homogeneous mixture of plastic isobutylene polymers and rubber, said composition being compounded of a colloidal rubber uniformly and completely swelled to a jelly-like mass, the rubber being substantially preserved against excessive decomposition so as to retain its colloidal structure, said isobutylene polymers being homogeneously dispersed in the rubber, and said jelly-like mass being smoothly spreadable on the surface of a fibrous sheet material without substantial penetration.

11. The process of preparing an improved composition for coating a fibrous sheet at its surface which comprises dissolving a high molecular weight non-volatile protective substance selected from the group consisting of paraffin wax, petrolatum, natural wax, and plastic isobutylene polymers in a major porportion of a volatile solvent capable of swelling rubber, swelling a flexible, colloidal rubber by the resulting solution until the rubber is uniformly and completely swelled to a jelly-like mass while retaining its aggregate colloidal structure with said high molecular weight non-volatile protective substance homogeneously and essentially intracellularly dispersed within particles of the colloidal rubber, and said jelly-like mass makes a smooth spreading, non-penetrating coating on the surface of a fibrous sheet, and removing any excess of the solution not absorbed by the rubber.

WILLIAM H. SMYERS.